T. V. BUCKWALTER.
AXLE CONSTRUCTION AND PROCESS OF ASSEMBLING SAME.
APPLICATION FILED AUG. 1, 1921.

1,409,133.

Patented Mar. 7, 1922.

Inventor:
Tracy V. Buckwalter,
by Carr & Carr,
his Attorneys

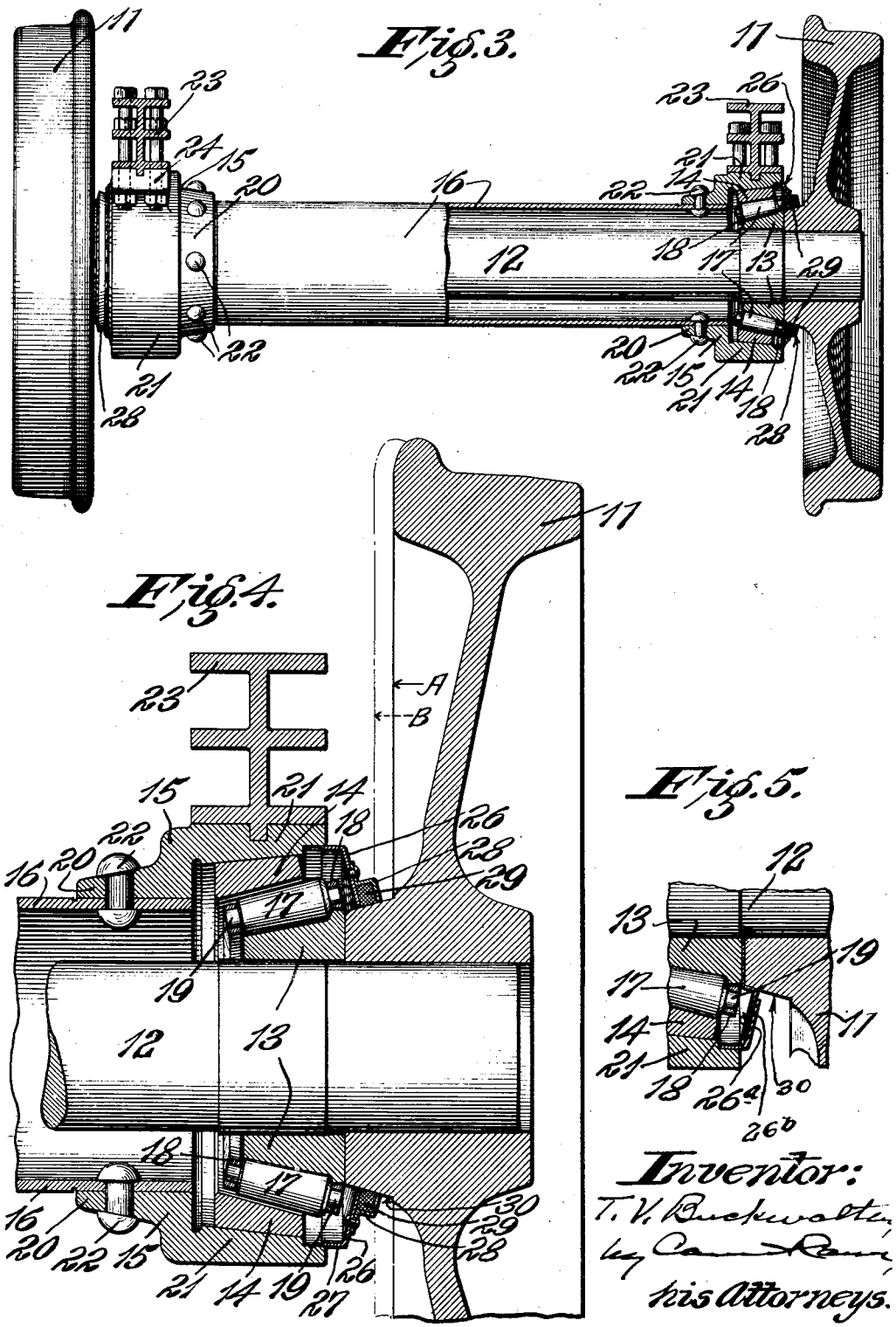

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

AXLE CONSTRUCTION AND PROCESS OF ASSEMBLING SAME.

1,409,133.  Specification of Letters Patent.  Patented Mar. 7, 1922.

Application filed August 1, 1921. Serial No. 488,905.

*To all whom it may concern:*

Be it known that I, TRACY V. BUCKWALTER, a citizen of the United States, and a resident of the city of Canton, in the county of Stark and State of Ohio, have invented a new and useful Improvement in Axle Constructions and Processes of Assembling Same, of which the following is a specification.

My invention relates to axles for railway cars and has for its principal objects to provide for the use of roller bearings, to provide for the lubrication thereof, to effect a considerable reduction in the weight and length of the axle construction in comparison with the weight of the car wheel axles now commonly used, to provide for locating the truck side frames between the car wheels, to reduce the bending moments upon the axle, and generally to improve the axle construction and simplify the operation of assembling the same. The invention consists principally in a hollow housing enclosing the axle and provided at its ends with roller bearings arranged to cooperate with the axle; it also consists in utilizing said housing as a reservoir for lubricant for said bearings; it also consists in the parts and combinations of parts and in the process of assembling them hereinafter described and claimed.

In the accompanying drawing, wherein like reference numerals refer to like parts wherever they occur, Fig. 1 is a plan view of a truck embodying my invention;

Fig. 3 is partly an end elevation and partly a vertical section through the axle on the line 3—3 of Fig. 1;

Fig. 4 is an enlarged vertical section through the outer end of the axle, showing the wheel in position to be pressed endwise on the axle to bring the bearing parts and the ring closure in proper positions; and Fig. 5 is a fragmentary detail section showing a modified form of closure.

Figure 1:
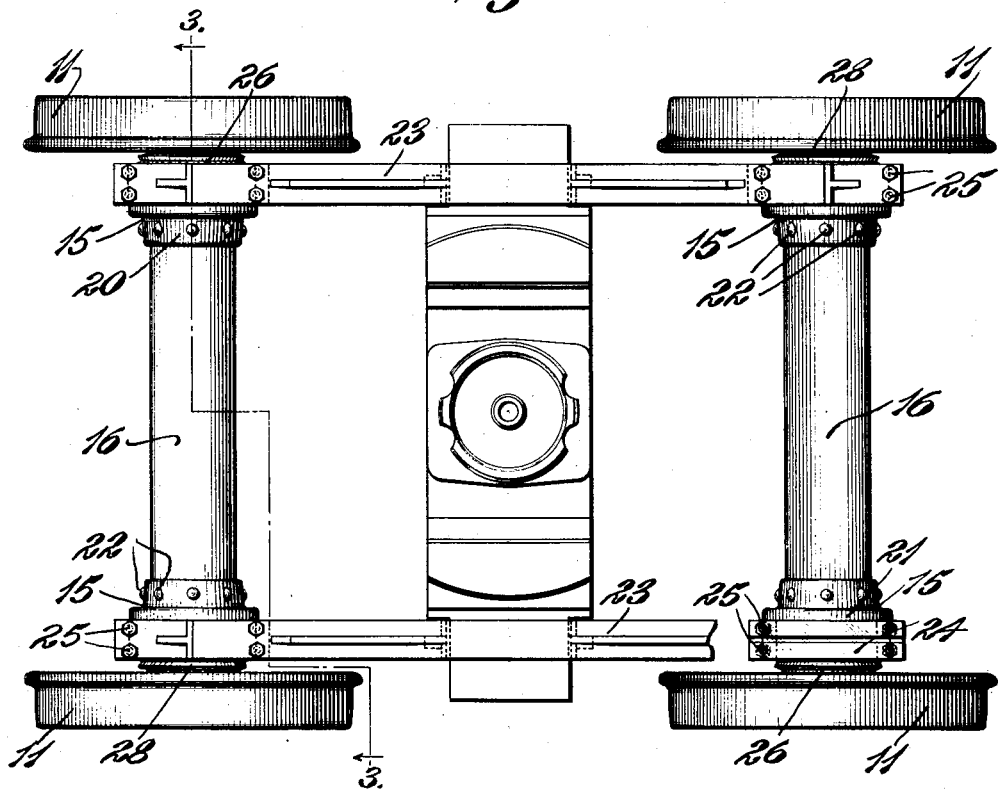
Figure 2:
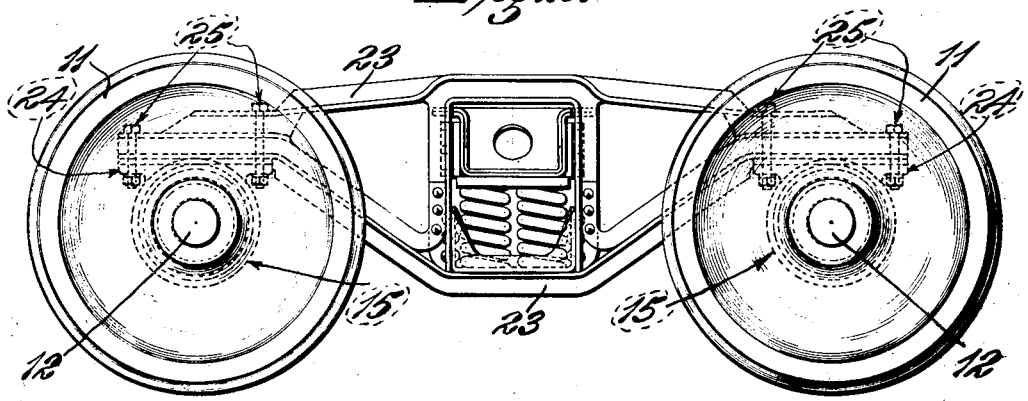
Fig. 2 is a side elevation thereof, with certain parts illustrated in dotted lines.

Referring to the annexed drawing, car wheels 11 are secured, as by a press fit, on the ends of the solid axles 12. Mounted on the axle next to each wheel is a cone 13 which constitutes an inner bearing member for a conical roller bearing, the cup 14 or outer bearing member thereof being mounted in the end member 15 of a hollow or tubular housing 16 that encases the axle 12. Between said cup and said cone are a circular series of tapered or conical antifriction rollers 17 that are rotatably mounted in a suitable spacing cage 18, whereby said rollers cooperate with the corresponding cup and cone in a well known manner. The cage 18 comprises annular end members and longitudinally extending bridges connecting them, preferably made in a single piece. Preferably, the conical rollers 17 have spindles 19 projecting axially from their ends and fitting in openings provided therefor in the annular end members of the cage 18. Preferably also the bridges are of a solid section, free from bent up flaps or wings and spaced far enough to minimize the tendency to trap and accumulate any grit or dirt that may get into the housing. A cage of this character will keep the rollers in proper alinement and permit them to run for long periods without fouling.

As stated above, the cups 14 for the roller bearings are secured in the end members 15 of the axle housing 16. This end member comprises a thick tubular portion 20 of proper diameter to fit over the end of the housing and a socket portion 21 concentric and integral therewith that projects beyond the body of the housing and forms the seat for the bearing cup. The first mentioned tubular portion 20, which fits over the end of the housing 16, is securely fastened thereto by rivets 22 or in any other suitable method. A great advantage of building up the housing in this manner is that it is very strong and enables the body of the housing to be made of comparatively thin metal, especially as the bearing is so close to the plane of the tread of the wheel and the bending moment on the housing is small.

With an axle of the kind described, it is feasible to locate the truck side frames 23 between the car wheels instead of beyond them, as is now the practice. For this purpose, the upper portion of the end member 15 of the housing has its upper portion spread crosswise and made flat or otherwise adapted to form a seat 24 for the end of the truck side frame. The end of the side frame is secured to the seat by bolts 25 extending vertically through the side frame and through openings provided therefor in said seat or lugs formed thereon.

A four-wheel truck comprises two side frames 23 secured as above mentioned to the end portions of the housings of two axle constructions, the wheels being outside of the truck side frames. By this arrangement, the truck side frames are located substantially in the plane of the roller bearings and close to the plane of the tread of the wheel; and consequently the bending moments are minimized and a much smaller axle may be used than is permissible with the ordinary construction. Besides this saving in weight due to the smaller cross-sectional size of the axle, a further saving is effected by the shortening of the axle due to the side frames being located between the wheels instead of beyond them.

The housing serves as a reservoir for lubricant, the interior of said housing being open directly to the roller bearing. In order to prevent the escape of lubricant, an annular piece of sheet metal 26 with a flange 27 on its outer periphery is pressed into the hollow end member 15 of the axle housing so as to form an oil-tight joint therewith. A second annular piece of sheet metal 28 of offset section is riveted to said first mentioned piece so as to form between them an annular recess for packing material 29. The two annular pieces of metal are dished or inclined to cooperate with the adjacent peripheral surface 30 of the hub of the wheel which is coned to cooperate therewith and thus prevent leakage of lubricant. As there is no wear between the outer periphery of the ring closure 26 and the end member 15 of the housing, the lower portion of the chamber below the inner edge of the closure ring constitutes a well that will hold lubricant even though there may be leakage between the closure and the hub of the wheel. The construction illustrated in Fig. 5 has a wider closure ring 26ª and its inner margin is clamped between the ends of the bearing cone 13 and the hub of the wheel. A second closure ring 26ᵇ overlaps the closure ring 26ª and has a flange at its outer periphery that is pressed into the hollow end member 15 of the axle housing. This construction dispenses with the use of packing material and at the same time forms a more capacious well.

Car wheels are commonly mounted on their axles by pressing them endwise thereof; and I contemplate using this method in assembling my axle construction. Assuming that the end members 15 are already riveted to the housing 16 and that one car wheel and one bearing are already secured to the axle, the closure ring 26 is slipped over the inner end of the hub of the wheel, the rollers 17 assembled in their cage 18 are slipped over the cone 13, the cup 14 is slipped into the socket portion 20 of the end member of the housing and then the housing is slipped endwise over the axle and properly positioned, with the outer flange 27 of the closure ring 26 fitting tight in the end thereof. At the other end, the cup is slipped into the end member of the housing, the rollers assembled in their cage are placed in the cup, the bearing cone is slipped over the axle, the closure ring is placed in the end of the end member and the car wheel is placed over the end of the axle, the parts being thus loosely assembled as indicated in full lines in Fig. 4. The ram of the press is then brought into action and it presses the wheel endwise on the axle from the position indicated by the line A to the position indicated by the dotted line B in Fig. 4, with the result that the parts are brought into proper relative positions, with the wheel firmly secured to the axle. As the end members of the housing are separate from the body of the housing, it is a simple matter not only to make the end members correctly but also to make the complete housing of exactly the length required for the effective operation of the antifriction bearings; and as the wheels are mounted on the axles with a "press-fit," and serve as abutments for the bearing cones, there is no difficulty in obtaining a proper adjustment of the bearing by moving one of the wheels endwise of the axle to the proper position which can be readily ascertained by noting the play endwise of the axle allowed to the housing. Likewise, when the bearings become worn and require readjustment (which condition is indicated by looseness or play of the housing endwise), such adjustment can be made by holding the axle and exerting on one of the wheels sufficient pressure to shift such wheel to the proper position to take up objectionable play of the housing. Obviously such adjustment could be made by holding a wheel and moving the axle relatively thereto.

I have not shown in the accompanying drawing any means of access to the interior of the housing; because I contemplate filling the housing with lubricant during the assembling of the parts and such initial filling is counted on as sufficient until it becomes necessary to return the axle to the shop for repairs. If desired, however, for the purpose of replenishing the supply of lubricant a tap hole may be formed in the top of the housing and closed by means of an ordinary threaded nut.

It is noted that the construction above described is not only simple and easy to make but that it has no parts that are likely to get out of order in ordinary practice. It is also noted that the bearing is especially designed to guard against fouling and is well adapted to take care of end thrusts as well as radial stresses. On account of the shortness of the axle and its small cross-sectional area, there is a great saving of metal and a great saving in the weight that is hauled around.

Obviously the construction above described admits of modification without departure from my invention. For instance, while I have described and prefer conical roller bearings, spherical or cylindrical rollers may be used.

What I claim is:

1. A car axle construction comprising a solid axle having car wheels pressed on the ends thereof, a housing enclosing said axle and conical roller bearings interposed between said housing and axle, said bearings being adjustable by shifting one of said wheels endwise of the axle.

2. A car axle construction comprising a rigid axle having car wheels fixed on the ends thereof, a housing enclosing said axle and conical roller bearings interposed between said housing and axle.

3. An axle construction comprising an axle having wheels fixed on the ends thereof, a housing enclosing said axle, and roller bearings between said housing and axle, said housing comprising a body portion and end portions fitting the ends of said body portion and fixed thereto, said end portions having sockets, roller bearing cups fitting in said sockets, cones on the axles and a series of conical bearing rollers interposed between each cup and corresponding cone.

4. An axle construction comprising an axle having wheels fixed on the ends thereof, a housing enclosing said axle, and roller bearings between said housing and axle, said housing comprising a body portion and end portions fitting the ends of said body portion and fixed thereto, said end portions having sockets, bearing cups in said sockets, inner bearing members on the axles and a series of conical bearing rollers interposed between each cup and the corresponding inner bearing member.

5. An axle construction comprising an axle having wheels fixed on the ends thereof, a housing enclosing said axle, roller bearings between said housing and axle, said housing comprising a body portion and end portions fitting the ends of said body portion and fixed thereto, said end portions having sockets, roller bearing cups fitting in said sockets, cones on the axles and a series of conical bearing rollers interposed between each cup and the corresponding cone.

6. A railway car truck comprising axles having wheels on the ends thereof, a housing enclosing each axle, conical roller bearings interposed between the ends of each housing and its enclosed axle, and truck side frames secured at their ends to the end portions of said housings, said wheels being outside of said truck frame.

7. An axle construction comprising an axle having wheels fixed on the ends thereof, a housing enclosing said axle, and roller bearings between said housing and axle, said housing comprising a body portion and end portions fitting the ends of said body portion and fixed thereto, said end portions having sockets, roller bearing cups fitting in said sockets, cones on the axles and a series of conical bearing rollers interposed between each cup and the corresponding cone, the sockets of said end portions constituting reservoirs for lubricant for said bearings.

8. An axle construction comprising an axle having wheels fixed on the ends thereof, a housing enclosing said axle, roller bearings between said housing and axle, said housing comprising a body portion and end portions fitting the ends of said body portion and fixed thereto, said end portions having sockets, roller bearing cups fitting in said sockets, cones on the axles and a series of conical bearing rollers interposed between each cup and the corresponding cone, and closures for said sockets, whereby said sockets are adapted to constitute reservoirs for lubricant for said bearings.

9. An axle construction comprising an axle having wheels fixed on the ends thereof, a housing enclosing said axle, roller bearings between said housing and axle, said housing comprising a body portion and end portions fitting the ends of said body portion and fixed thereto, said end portions having sockets, roller bearing cups fitting in said sockets, cones on the axles and a series of conical bearing rollers interposed between each cup and the corresponding cone, and means for closing the end portions of said housing, whereby said housing is adapted to be utilized as a reservoir for lubricant for said bearings.

10. A railway car truck comprising axles having wheels on the ends thereof, a housing enclosing each axle, conical roller bearings interposed between the ends of each housing and its enclosed axle, truck side frames secured at their ends to the end portions of said housings, said wheels being outside of said truck frame, and closures for the ends of each housing, whereby said housings are adapted to constitute reservoirs for lubricant for said bearings.

11. The method of assembling an oiltight axle construction having roller bearings which consists in securing to one end of the axle a bearing cone and a car wheel, applying a series of conical rollers to said cone and then slipping over said axle a hollow housing having bearing cups in both ends thereof, applying a series of conical bearing rollers to the cup in the exposed end of said housing and then pressing onto the exposed end of the axle a bearing cone and a car wheel.

12. The method of assembling an oiltight axle construction having roller bearings which consists in securing to one end of the axle a car wheel and a bearing cone, equipping said wheel with a closure adapted for cooperation with the hereinafter mentioned housing, applying a series of rollers to said cone, slipping over said axle a hollow housing having bearing cups in its ends, inserting in the vacant cup a series of rollers and a cone therefor, and applying a wheel to the end of the axle together with an annular closure member adapted to close the space between said last mentioned wheel and housing cup.

13. The method of assembling an oil-tight axle construction having roller bearings which consists in securing to one end of the axle a bearing cone and a car wheel, applying a series of rollers to said cone and then slipping over said axle a hollow housing having bearing cups in both ends thereof, applying a series of conical bearing rollers to the cup in the exposed end of said housing and a cone to said rollers and pressing a car wheel onto the end of said axle.

14. The method of assembling an oil tight axle construction having roller bearings which consists in securing to one end of the axle a bearing cone and a car wheel, applying a series of conical rollers to said cone and then slipping over said axle a hollow housing having bearing cups in both ends thereof, applying a series of conical bearing rollers to the cup in the exposed end of said housing and a cone to said rollers and positioning a car wheel on the exposed end of the axle in such position as to permit such slight play of the housing endwise of the axle as is suitable for roller bearing purposes.

15. The method of adjusting for wear a car axle construction, wherein there are car wheels pressed on the ends of an axle which is enclosed in a housing with conical roller bearings interposed between said axle and the ends of a housing, which consists in forcing one of said wheels endwise of said axle to take up the endwise play of the housing relative to said axle.

Signed at Canton, Ohio, this 29th day of July, 1921.

TRACY V. BUCKWALTER.